(12) United States Patent
Yamada

(10) Patent No.: US 11,853,620 B2
(45) Date of Patent: *Dec. 26, 2023

(54) PRINTING DEVICE, PRINTING SYSTEM, AND NON-TRANSITORY COMPUTER-READABLE RECORDING MEDIUM THEREFOR

(71) Applicant: Brother Kogyo Kabushiki Kaisha, Nagoya (JP)

(72) Inventor: Takatsugu Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,350

(22) Filed: Jan. 20, 2023

(65) Prior Publication Data

US 2023/0236771 A1 Jul. 27, 2023

Related U.S. Application Data

(63) Continuation of application No. 17/456,677, filed on Nov. 29, 2021, now Pat. No. 11,586,394.

(30) Foreign Application Priority Data

Nov. 30, 2020 (JP) .................................. 2020-198923

(51) Int. Cl.
  *G06F 3/12* (2006.01)
  *G03G 15/00* (2006.01)
  *G06K 15/00* (2006.01)

(52) U.S. Cl.
  CPC ......... *G06F 3/1203* (2013.01); *G03G 15/553* (2013.01); *G06F 3/1288* (2013.01); *G06K 15/402* (2013.01)

(58) Field of Classification Search
  CPC .... G06F 3/1203; G06F 3/1288; G06F 3/1259; G06F 3/1219; G06F 3/1229;
  (Continued)

(56) References Cited

U.S. PATENT DOCUMENTS

2016/0292550 A1* 10/2016 Kawai ................. G06K 15/102
2017/0063646 A1* 3/2017 Kawai ..................... G06Q 10/10
2017/0090830 A1* 3/2017 Tomono ................ G06F 3/1219

FOREIGN PATENT DOCUMENTS

JP 2016-193592 A 11/2016

* cited by examiner

*Primary Examiner* — Iriana Cruz
(74) *Attorney, Agent, or Firm* — BURR PATENT LAW, PLLC

(57) ABSTRACT

A printing device comprises a housing, a communication interface configured to communicate with a server, and a controller. The printing device is configured to operate either in a contract mode or in a normal mode. The housing is configured such that one or more consumables including a first type consumable and a second type consumable are attachable. The first type consumable is dedicated for the contract printing, and the second type consumable is usable for printing in both the contract mode and the normal mode. The controller is configured to activate the contract mode in response to an activation instruction from the server. In a case where the second type consumable is attached to the housing when the contract mode is activated, the controller changes a state of the printing device to a contract printing state in which the contract printing is activated after activating the contract mode.

16 Claims, 7 Drawing Sheets

(58) Field of Classification Search
CPC .... G03G 15/553; G06K 15/402; H04N 1/346; H04N 1/00244; G06Q 30/02
See application file for complete search history.

|    | CARTRIDGE ID | CARTRIDGE TYPE | INK REMAINING AMOUNT |
|----|--------------|----------------|----------------------|
| BK | bk6865 | BUNDLED | 50% |
| C  | No Cartridge | No Cartridge | No Cartridge |
| M  | m9843 | COMMERCIAL | 10% |
| Y  | y0652 | CONTRACT | EMPTY |

FIG. 2

PRINTING DEVICE, PRINTING SYSTEM, AND NON-TRANSITORY COMPUTER-READABLE RECORDING MEDIUM THEREFOR

REFERENCE TO RELATED APPLICATIONS

This application is a continuation application of U.S. patent application Ser. No. 17/456,677 filed on Nov. 29, 2021 which claims priority under 35 U.S.C. § 119 from Japanese Patent Application No. 2020-198923 filed on Nov. 30, 2020. The entire subject matter of the application is incorporated herein by reference.

BACKGROUND ART

The present disclosures relate to a printing device and a printing system and a non-transitory computer-readable recording medium therefor.

In recent years, flat-rate printing services have been widely offered to users of printing devices. The flat-rate printing service is a service that can be subscribed for each printing device, and is also referred to as a subscription service. For example, a flat-rate printing service allows users to print up to a particular number of pages during a particular period of time at a fixed usage fee. An excess fee may be charged for usage in excess of the amount specified in the contract.

DESCRIPTION

When a user signs up for the flat-rate printing service, various information is sent and received between the server of the service provider and the user's printing device. This is so that the server can identify the printing device that will be the target of the contract, and also so that the user's printing device can make various settings related to the providing of the flat-rate printing service.

In the conventional flat-rate printing service, the server provides the user with a starter kit of consumables dedicated for flat-rate printing after the server recognizes the printing device as a contracted device. In this case, however, there was a problem that a time lag occurred from the time the user signed the contract until the starter kit was delivered to the user and the flat-rate printing became possible. This issue may arise in the same way for any printing based on the terms of the contract, other than flat-rate printing. Regardless of the providing of a starter kit, if dedicated consumables are set up for printing based on a contract, a time lag may occur between the time the user signs the contract and the time the user obtains the dedicated consumables.

According to aspects of the present disclosure, there is provided a printing device comprising a housing, a communication interface configured to communicate with a serve, and a controller. The printing device can operate either in a contract mode or in a normal mode. The contract mode is a mode in which the printing device is recognized as a device subjected to a contract that is qualified to perform contract printing based on contract terms of the contract with a business entity. The normal mode being a mode in which the printing device does not perform the contract printing. The housing is configured such that one or more consumables including a first type consumable and a second type consumable are attachable. The first type consumable is dedicated for the contract printing in the contract mode. The second type consumable is usable for printing in both the contract mode and the normal mode. The controller can perform, in a case where the second type consumable is attached to the housing change a state of the printing device to a contract printing state in which the contract printing is activated and activate the contract mode of the printing device in response to an activation instruction from the server.

FIG. 2 is an example of cartridge information.

FIRST EMBODIMENT

Overview of Printing System

Figure 1:
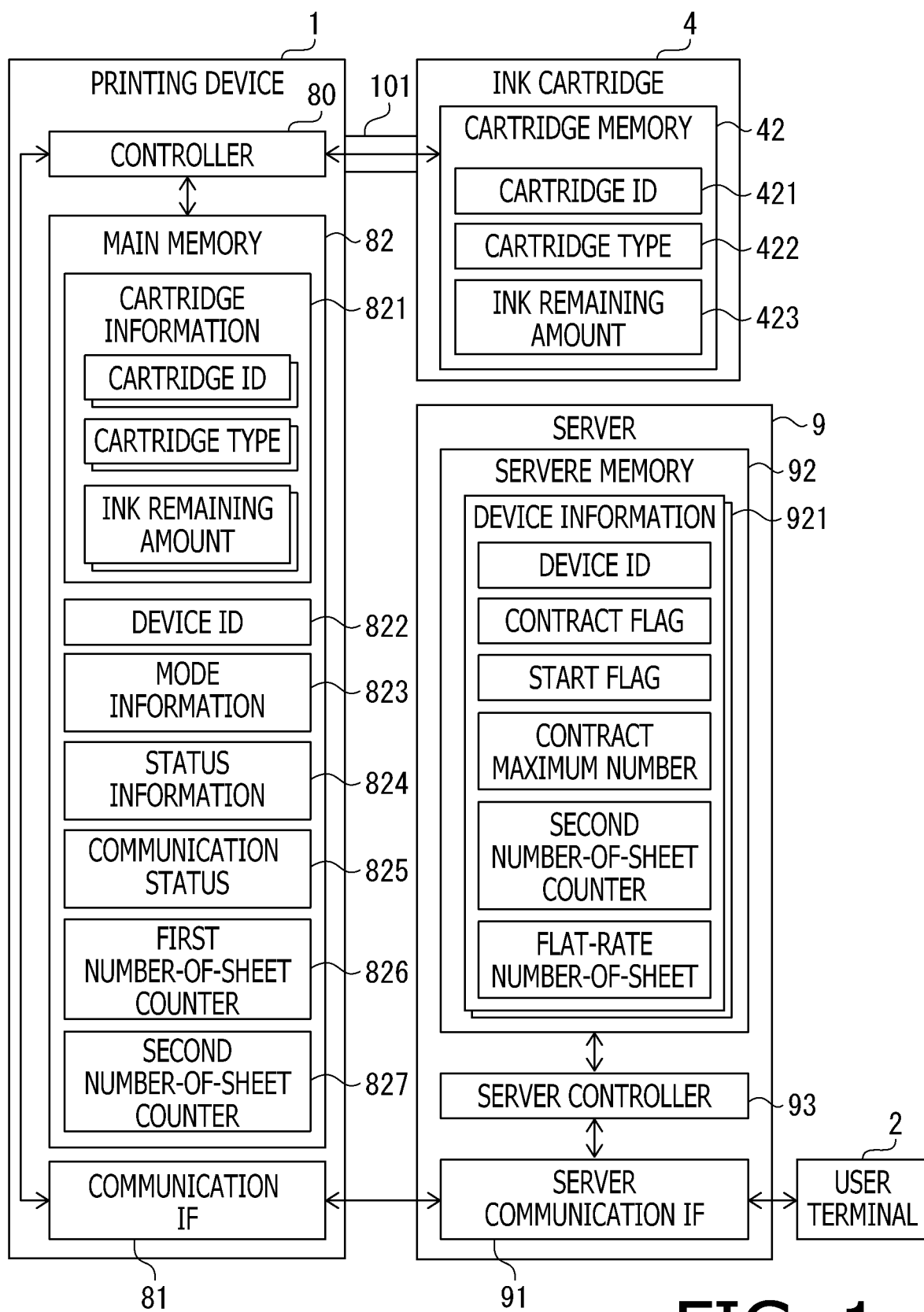
FIG. 1 is a block diagram illustrating a main structure of a printing system according to a first embodiment.

Hereinafter, an embodiment of the present disclosure is described below with reference to FIGS. 1 through 6. As shown in FIG. 1, a printing system 100 according to the present embodiment is provided with a printing device 1, an ink cartridge 4, a server 9, and a user terminal 2. It is noted that the user terminal 2 is not an essential configuration in the printing system 100 according to aspects of the present disclosures. Further, devices constituting the printing system 100 are configured to communicate with each other via a communication network such as the Internet.

The printing device 1 is configured to perform contract printing, which is printing based on terms of a contract made with a business entity. The server 9 is an external device configured to communicate with the printing device 1 via a network. The server 9 is an example of a management device configured to manage the printing device 1. In the present embodiment, the server 9 is a server managed by the business entity.

In the present disclosures, the contract is defined as a contract made between a user of the printing device 1 and the business entity, and according to which contract, the business entity provides a particular service via the printing device 1 designated by the user. In other words, it can be said that the user makes a contract for a certain printing device 1. It is also said that the printing device 1 is a device subjected to the contract. In the following description, the printing device 1 designated by the user as the subject of the contract is referred to as the "contract-subject device."

At the time the contract is made, concrete conditions (contract terms) are agreed upon, such as a period of use of a service, a fee for use, and a maximum number of pages to be printed with the service applied. It is noted that the contract conditions may be changed later. Further, the user may register or change the printing device 1 as a contract-subject device at any time. The term "registration" here may be a new registration or a re-registration of the printing device 1 that was previously registered and terminated.

In the present embodiment, as an example, it is assumed that the "service" is a flat-rate printing service. The flat-rate printing service is a service that allows a user to perform "flat-rate printing," which is an example of contract printing, at a fixed usage fee indicated by the contract terms, as long as the usage period and the maximum number of pages to be printed are within the range indicated by the contract terms. The detailed provisions of the flat-rate printing service may be defined as appropriate, but for example, the flat-rate printing service may provide the consumables and/or replacement items used for the flat-rate printing to the user at a flat rate as long as the aforementioned usage period and the maximum number of pages are not exceeded.

It is noted that the timings of (1) and (2) below may be different for the flat-rate printing services.
  (1) a timing at which the server 9 recognizes the printing device 1 as a contract-subject device
  (2) a timing at which the server 9 regards that the printing device 1 has started using the flat-rate printing service In other words, in the flat-rate printing service, the server 9 may recognize the printing device 1 as "a device subjected to the contract, but the use of the flat-rate printing service has not yet started." The "start of use of the flat-rate printing service" in (2) above refers only to the "start of use of the service" and does not depend on whether or not the flat-rate printing has actually been performed.

When the flat-rate printing service is a paid service, the timing defined in item (2) may be taken as synonymous with "a timing at which charging for the flat-rate printing service for the printing device 1 is started." In this document, unless otherwise stated, it is assumed that the flat-rate printing service is a paid service. Therefore, the timing defined in item (2) is assumed to be the timing to start charging.

The type of printing device 1 is not limited to a particular type as long as consumables such as ink cartridges or toner cartridges can be installed and has a function to execute printing using the consumables and a communication function. For example, the printing device 1 may be an inkjet printer or a laser printer. Alternatively, the printing device 1 may be an MFP (Multi Function Printer/Peripheral) that is also equipped with other functions such as a scanner and/or a facsimile.

In the present embodiment, as an example, a case where the printing device 1 is an inkjet printer that is configured to print data on a printing sheet by discharging ink droplets will be described. One or more ink cartridges are attached to a housing of the printing device 1. In the present embodiment, as an example, it is assumed that four ink cartridges of cyan (C), magenta (M), yellow (Y), and black (BK) colors are attached to the printing device 1. The printing device 1 may be provided with a display such as an LCD or a lamp, and an input device such as operation buttons. The LCD may be integrated with a touch panel so as to be configured to function as an input device.

The server 9 is a management device that manages one or more printing devices 1. In the example of FIG. 2, the server 9 is connected to only one printing device 1, but the server 9 may be communicatively connected to multiple printing devices 1.

The server 9 used by the business entity is configured to communicate with the printing device 1 through the communication network and complete a series of information processing related to the contract procedure in cooperation with the printing device 1. In the following description, the series of information processing related to the contract procedure will be referred to as a contract-related process. As a result, the server 9 recognizes the printing device 1 as the device subjected to the contract, and finally, the printing device 1 is recognized as the contract-subject device on the printing system 100.

In the present embodiment, the server 9 is configured to determine to provide the user with contract-subject device designated by the business entity, triggered by the recognition of the printing device 1 as a contract-subjected device. A method of providing the consumables from the business entity to the user is not particularly limited. For example, the business entity may send the consumables dedicated for flat-rate printing to the user by mail. The user attaches the provided consumables dedicated for flat-rate printing in the printing device 1. As a result, it is enabled that the printing device 1 performs flat-rate printing.

Internal Configuration

Ink Cartridge 4

The ink cartridge 4 has a cartridge memory 42. The cartridge memory 42 is configured such that information can be written to and readout from the cartridge memory 42. The cartridge memory 42 is, for example, a flash ROM (Read Only Memory) or an EEPROM® (Electrically Erasable Programmable ROM).

The cartridge memory 42 has a first area 421, a second area 422, and a third area 423 for storing information related to the ink cartridge 4. The first area 421 is configured to store a cartridge ID. The second area 422 is configured to store a cartridge type. The third area 423 is configured to store an ink remaining amount. Data stored in the third area may be rewritable. The areas for storing the cartridge ID and the ink remaining amount may be omitted for the purpose of the present disclosure as appropriate.

The cartridge ID is, for example, a unique serial number that identifies an individual ink cartridge 4. The cartridge ID may include information indicating the ink color, the model number, a manufacturer and a production lot of that ink cartridge.

The cartridge type is information that indicates the type of ink cartridge 4. In the present embodiment, any of at least three types (i.e., "Contract," "Bundled," and "Commercial") can be set as the type of the ink cartridge.

The ink cartridge in which the type "Contract" is stored in the second area 422 is an ink cartridge dedicated for the flat-rate printing. In the following, the ink cartridge of this type will be referred to as the contract cartridge (which is an example of a first type consumable). In the present embodiment, the contract cartridge is shipped to the user by the provider of the flat-rate printing service. In the present embodiment, the first shipment of the contract cartridge may be performed after the contract has been concluded, triggered by the fact that the printing device 1 has entered the contract mode.

The ink cartridge in which the type "Bundled" is stored in the second area 422 is an ink cartridge that is bundled to the printing device 1 when the new printing device 1 is delivered, for example, when the printing device 1 is purchased by the user. In the following description, this type of ink cartridge will be referred to as a bundled cartridge (which is an example of a second type consumable). The bundled cartridge is a consumable that can be used for both the normal printing and the flat-rate printing. The bundled cartridge may be the ink cartridge 4 that is used to fill the printing device 1 with ink for the first time (i.e., at the initial filling) during the preparation operation of the printing device 1 for use (e.g., the initial operation until the new printing device 1 is ready to print).

The bundled cartridge does not have to be physically bundled with the printing device 1, as long as the user can obtain the same at the time of purchasing of the printing device 1. The bundled cartridge may also contain less ink than the contract cartridge and/or a commercial cartridge which will be described later.

In more detail, the bundled cartridge is configured such that, when installed in the printing device 1 operating in the normal mode, the bundled cartridge can activate the contract mode of the printing device 1 in the same way as the commercial cartridge. The bundled cartridge is also a consumable that, when installed in the printing device 1 operating in the contract mode, is capable of contract printing just like the contract cartridge.

The ink cartridge in which the type "Commercial" is stored in the second area 422 is the commercial ink cartridge that can be purchased from consumer electronics stores or mail order sites. In the following description, this type of ink cartridge is referred to as a commercial cartridge (which is an example of a third type consumable). The commercial cartridge may be so-called a genuine product manufactured by the manufacturer of the printing device 1, or they may be so-called a compatible consumable manufactured by a third party other than the manufacturer.

When a contract mode (described in detail later) of the printing device 1 is activated and when the cartridge installed to the printing device 1 is the contract cartridge or the bundled cartridge, the printing device 1 can perform the contract printing. In other words, the printing device 1 cannot perform the contract printing when the commercial cartridge is installed. The contract cartridges are provided by the business entity to the user who has concluded a contract for the printing device 1. It is noted that the method of providing the contract cartridge to the user is not particularly limited. In the present embodiment, it is assumed that the shipping server that received the instruction from the server 9 ships the contract cartridge to the address of the user registered in advance.

In the present embodiment, a set of contract cartridges for use in the printing device 1 that has newly become a contract-subject device will be referred to as an "initial contract cartridge." In other words, the initial contract cartridge is the contract cartridge to be used for the first time for the flat-rate printing.

An ink remaining amount is information that indicates the remaining amount of the ink in the ink cartridge 4. As an example, the ink remaining amount is indicated by values corresponding to multiple stages from full to empty, and the values are stored in the third area 423. Each stage of the ink remaining amount may be notified to the user by words, such as "FULL" to "EMPTY", in numerical values, such as "100%" to "0%", or by a combination of such expressions, based on the aforementioned words and values.

The housing of the printing device 1 has a connector 101. When the ink cartridge 4 is installed in the housing of the printing device 1, the connector 101 is electrically connected to the cartridge memory 42. Then, the controller 80 of the printing device 1 can communicate with the cartridge memory 42 of the ink cartridge 4.

Printing Device 1

The printing device 1 has a controller 80, a communication IF 81, and a main memory 82. The controller 80 has, for example, an ASIC (Application Specific Integrated Circuit). The controller 80 is electrically connected to the main memory 82 and the communication interface 81, which are provided in the housing of the printing device 1. The controller 80 controls the printing device 1 to perform various processes related to printing by executing various operations.

The controller 80 may also execute a communication monitoring process to monitor the communication state between the printing device 1 and the server 9. The communication monitoring process may be performed periodically while the power of the printing device 1 is in an ON state, regardless of other processes in the printing device 1.

The controller 80 may be equipped with a processor such as a CPU (Central Processing Unit). In such a case, a control program to realize a control method of the printing device 1 may be stored in the main memory 82, and the controller 80 may control the printing device 1 to perform various processes by the processor operating according to the control program.

The controller 80 may also be provided with a computer-readable recording medium, such as the main memory 82, on which the control program is stored. The recording medium may be a "non-transitory tangible medium," such as a ROM or the like, as well as a tape, a disk, a card, a semiconductor memory, a programmable logic circuit, and the like. The RAM (Random Access Memory) or the like may also be used to develop the control program. The control program may also be supplied to the computer via any transmission medium capable of transmitting the control program (e.g., a communication network, a broadcast signal, or the like.). Aspects of the present disclosure may also be realized in the form of a data signal incorporated in a carrier wave, in which the control program is embodied by electronic transmission.

When the ink cartridge 4 is installed in the printing device 1, the ink cartridge 4 is electrically connected to the controller 80, as shown in FIG. 1. As a result, the controller 80 can perform a process of reading information from the cartridge memory 42 and a process of writing information (including a process of rewriting) to the cartridge memory 42.

The main memory 82 is configured such that information can read therefrom, and can be written thereto. The main memory 82 is, for example, a flash ROM or an EEPROM®. The main memory 82 has, as an example, seven areas from area 821 to area 827, and each area stores the various information as described below.

In the area 821, cartridge information is stored. The cartridge information is information about the ink cartridges 4 of each color installed in the printing device 1. Concretely, the cartridge information includes a cartridge ID read from each cartridge memory 42, a cartridge type, and the ink remaining amount, which are associated with a corresponding one of the ink cartridges 4.

FIG. 2 shows a concrete example of the cartridge information stored in area 821. As an example, the cartridge information includes a column of the cartridge ID, a column of the cartridge type, and a column of the ink remaining amount for each row of the ink cartridge 4 of each color.

The controller 80 can read the cartridge information from the area 821 and can recognize the installation state of the ink cartridge 4 in the printing device 1. Then, the controller 80 can determine the suitability of activating the contract mode based on the recognized installation state in the above-described determination process.

In the example shown in FIG. 2, the value of "No Cartridge" is stored in each column of the row of the cyan. According to the configuration, the controller 80 can determine that the cyan ink cartridge 4 is not installed in the printing device 1. In the example shown in FIG. 2, the values "Bundled," "Commercial," and "Contract" are stored in the cartridge type columns, in the order of black, magenta, and yellow, respectively. As a result, the controller 80 can determine that the black ink cartridge 4 currently installed in the printing device 1 is the bundled cartridge, the magenta ink cartridge 4 is the commercial cartridge, and the yellow ink cartridge 4 is the contract cartridge. The controller 80 can also determine the ink remaining amount in the ink cartridge 4 of each color based on the column of ink remaining amount.

In the present embodiment, the controller 80 refers to the cartridge information to determine the suitability of activating the contract mode, depending on the installation status of the ink cartridge 4 in the printing device 1. The contract mode will be described in detail later.

A concrete example of the cartridge information referred to by the controller 80 will be described in detail later based on another drawing.

In the area 822, the device ID is stored. The device ID is identification information used to identify the printing device 1. The device ID is, for example, a serial number of the printing device 1.

The mode information is stored in the area 823. The mode information is information that indicates the operation mode of the printing device 1. In the present embodiment, as an example, two types of modes (i.e., the "contract mode" and the "normal mode") are defined. The "normal mode" is a mode indicating that the printing device 1 is not the contract-subject device and operates as a normal printing device.

Mode Information

The "contract mode" is one of the operation modes of the printing device 1, and is an operation mode in which the printing device 1 is recognized by the server 9 as the contract-subject device that is qualified to perform the contracted printing based on the contract. The "normal mode" is one of the operation modes of the printing device 1, and is an operation mode in which the printing device 1 does not perform the contract printing. When the printing device 1 operates in the normal mode, the printing device 1 is not recognized by the server 9 as the contracted device. The printing device 1 according to the present embodiment is configured to operate in each of the contract mode and in the normal mode, and operates in either one of the contract mode or the normal mode.

In the normal mode, the printing device 1 performs the normal printing but not the contract printing. The normal printing is printing using commercial cartridges. In the normal mode, when the ink is exhausted by printing, the user may purchase a new commercial cartridge to refill the same. In other words, the normal printing is printing in which the cost of purchasing commercial cartridges increases with the amount of printing. In the present embodiment, the "normal printing" is also referred to simply as "printing."

At the time of shipment of the printing device 1, a value corresponding to the normal mode is stored in the area 823 as a default value. The server 9 is configured to transmit an activating instruction instructing to activate the contract mode to the printing device 1 designated by the user at the time of concluding the contract. The controller 80 sets the value of the area 823 to a value corresponding to the contract mode, using the activating instruction from the server 9 as a trigger. In the present embodiment, "activating the contract mode of the printing device 1" means that the controller 80 sets the value of the area 823 to a value corresponding to the contract mode.

The controller 80 may release the activation of the contract mode (i.e., deactivate the contract mode) when a particular condition is met. That is, the controller 80 may reset the mode information to the value corresponding to the normal mode. For example, the controller 80 may return the mode of the printing device 1 to the normal mode when an instruction to terminate the contract mode is received from the server 9.

Status Information

The status information is stored in the area 824. The status information is information that indicates whether or not the contract is applied in the printing device 1. According to the present embodiment, two types of status information are defined. The two types of status information indicate a "before billing" state and an "after billing" state, respectively. The "before billing" state is a state in which the application of the contract has not started, while the "after billing" state is a state in which the application of the contract has started. When the printing device 1 is shipped, the value corresponding to the "before billing" state is stored in the area 824 as the initial value. The controller 80 is configured to rewrite the value of the status information in area 824. In the present embodiment, "changing the state of the printing device 1" means that the controller 80 changes the value in the area 824.

Mode Information, Status Information and Status of Printing Device

The status of the printing device 1 is defined by a combination of the mode information and the status information. When the mode information indicates the "normal mode," regardless of the status information, the printing device 1 is not recognized as the contract-subject device and the flat-rate printing is cannot be performed.

When the mode information indicates the "contract mode" and the status information indicates the "before billing" state, the printing device 1 is recognized as the contract-subject device, but billing has not been started. In the present embodiment, when only the commercial cartridges are installed in the printing device 1 at the time when the server 9 instructs to activate the contract mode of the printing device 1, the printing device 1 is in the "contract mode" and "before billing" state. In other words, it can be said that the state in which the printing device 1 is in the "contract mode" and the "before billing" state is the state in which the printing device 1 is waiting for the commercial cartridge installed in the housing to be replaced with at least one of the contract cartridge and the bundled cartridge. Therefore, in the present embodiment, the state in which the printing device 1 is in the "contract mode" and the "before billing" state is also referred to as a "replacement standby" state.

When the mode information indicates the "contracted mode" state and the status information indicates the "after billing" state, the printing device 1 is the contract-subject device and billing has been started. In other words, this state indicates that the printing device 1 is ready for the contract printing. In the present embodiment, the state in which the printing device 1 is in the "contract mode" and in the "after billing" state is also referred to as a "contract printing state."

The printing device 1 may be capable of performing printing other than the contract printing even when it is operating in the contract printing state. For example, it is assumed that, when the printing device 1 is in the contract printing state, the bundled cartridge or the contract cartridge installed in the printing device 1 is removed and a commercial cartridge is installed. In such a case, the printing device 1 may perform the normal printing that can be performed using the commercial cartridge while the printing device 1 remains recognized, by the server 9, as a contract-subject device (i.e., the printing device 1 operating in the contract printing state). In addition, the printing device 1 may be capable of performing printing other than the contract printing when it is operating in the replacement standby state. For example, when the printing device 1 is in the replacement standby state, it may perform the normal printing that can be performed using the commercial cartridges installed in the printing device 1.

The communication status is stored in the area 825. The communication status is information that indicates the communication status between the printing device 1 and the server 9. Alternatively, the communication status may be information indicating whether the printing device 1 is online or offline. When the communication interface 81 is connected to a communication network and can communicate with an external device, a value indicating that the printing device 1 is online is stored in the area 825 as the communication status. On the other hand, when the communication interface 81 is not connected to the communication network and unable to communicate with the external device, a value indicating that the printing device 1 is offline is stored in the area 825 as the communication status. In another example, the controller 80 may monitor, via the communication interface 81, the communication status with the server 9 according to a known communication protocol. In this case, the controller 80 may distinguish a state in which the printing device 1 is unable to communicate with the server 9 due to a problem on the server 9 side from the aforementioned online and offline states, and store a different value indicating the current state of the communication state of the printing device 1 in the area 825.

A first number-of-sheet counter is stored in the area 826. The first number-of-sheet counter indicates a cumulative total number of printed sheets printed by the printing device 1. In other words, the value of the first number-of-sheet counter is the cumulative total number of printed sheets which are printed by the normal printing and the number of printed sheets which are printed by the flat-rate printing. A second number-of-sheet counter is stored in area 827. A second number-of-sheet counter indicates the number of printed sheets printed by the flat-rate printing in the printing device 1. The second number-of-sheet counter may be reset to 0 every time the printing device 1 activates the contract mode from the no-contract mode, or the second number-of-sheet counter may indicate the cumulative total number of printed sheets printed by the flat-rate printing in the printing device 1 up to now. Hereafter, unless otherwise stated, the value of the second number-of-sheet counter is the cumulative total number of printed sheets printed by the flat-rate printing up to now.

In addition to the aforementioned information, the main memory 82 may have an area configured to store, for example, the total number of printed sheets printed in the printing device 1.

The communication interface 81 realizes a communication between the printing device 1 and the server 9 via an unshown communication network such as the Internet, for example. The communication interface 81 outputs requests received from the server 9 to the controller 80. It is noted that the "request" refers to various requests, instructions, inquiries, and the like transmitted from the server 9 in contract-related processes. The communication interface 81 returns results of calculation which is performed by the controller 80 in response to the requests and output thereby to the server 9 as a "response." In the present embodiment, the reply to the response by the communication interface 81 may be omitted. When the request is an instruction to change various settings in the printing device 1, the controller 80 changes the various settings in the printing device 1 in accordance with the instruction. In such a case, however, replying to the server 9 via the communication interface 81 with a notification that the settings have been changed may be omitted.

Server 9

The server 9 is equipped with a server communication IF 91, a server memory 92, and a server controller 93. The server communication IF 91 is a communication interface for communication between the server 9 and the printing device 1. The server communication IF 91 transmits requests input from the server controller 93 to the printing device 1. The server communication IF 91 receives the response transmitted from the printing device 1 in response to the transmitted request, and outputs the same to the server controller 93.

The server communication IF 91 also communicates with the user terminal 2 operated by the user of the printing device 1, and transmits and receives information to and from the user terminal 2. In the present embodiment, the server communication IF 91 exchanges various information necessary for concluding the contract with the user terminal 2. Concretely, the server communication IF 91 may be configured to receive a contract request message requesting the conclusion of a contract from the user terminal 2. This contract request message may include a device ID that identifies the printing device 1. After the server controller 93 executes contract-related process in response to this contract request message, the server communication IF 91 may transmit a notification to the user terminal 2 to notify that the printing device 1 is recognized as a contract-subject device.

The server memory 92 is a storage device configured to store data necessary for the operation of the server 9. The server memory 92 has an area 921 configured to store device information for each printing device 1. The device information includes data various information about the printing device 1. The device information is generated for each printing device 1. The device information may include, for example, a device ID, a contract flag, a start flag, a contracted maximum number of sheets, a second number-of-sheet counter, and the number-of-sheet of the flat-rate printing. Optionally, the device information may include, for example, a model number of the printing device 1, the date of manufacture of the printing device 1, and the like.

The device ID is identification information used by the server 9 to uniquely identify the printing device 1. The contract flag is information that indicates whether the contract mode of the printing device 1 has been activated, i.e., whether the printing device 1 has already been recognized as a contract-subject device.

The start flag is information that indicates whether the flat-rate printing service has been started in the printing device 1. In the present embodiment, the start flag is also information that indicates whether billing to the printing device 1 has started. The initial value of the start flag is set to a value that means "not yet." The start flag meaning "not yet" indicates that the flat-rate printing service has not yet been started in the printing device 1.

When the server controller 93 of the server 9 is notified by the controller 80 of the printing device 1 that the flat-rate printing service has been started in the printing device 1, the server controller 93 sets the start flag from the value meaning "not yet" to a value meaning "already started." The start flag meaning "already started" indicates that the flat-rate printing service has already been started in the printing device 1.

The contracted maximum number of sheets is the upper limit of the number of sheets that the printing device 1 can print in the flat-rate printing during a particular period defined by the contract. The second number-of-sheet counter is the same information as the second number-of-sheet counter in the printing device 1. The number-of-sheet of the flat-rate printing is information that indicates the number of sheets of printed sheets printed by the printing device 1 using the flat-rate printing service since the printing device 1 started the flat-rate printing service. In the case where the user has cancelled and then re-concluded the contract with the printing device 1, the number-of-sheet of the flat-rate printing indicates the number of printed sheets printed from the start of the flat-rate printing service using the flat-rate printing service in the latest contract. The server controller 93 of the server 9 updates the values of the second number-of-sheet counter and the number-of-sheet of the flat-rate printing printed in the device information stored in the area 921 of the server memory 92 in accordance with a notification from the controller 80 of the printing device 1.

The server controller 93 is a CPU configured to control overall operations of the server 9. At a particular timing, the server controller 93 generates a request directed to the printing device 1 and outputs the generated request to the server communication unit 91. In the present embodiment, the request includes, for example, an instruction to activate the contract mode of the printing device 1. Hereafter, the "instruction for activating the contract mode of the printing device 1" is also referred to simply as an "activation instruction." The server controller 93 controls the server communication unit 91 and transmits the activation instruction to the printing device 1 designated by the user, triggered by the reception of the contract request message transmitted from the user terminal.

In addition, the server controller 93 is configured to store new device information in the area 921 of the server memory 92 or updates the device information already stored in the server memory 92, based on the response received from the printing device 1 via the server communication IF 91. More in detail, for example, when the server communication IF 91 receives a contract request message from the user terminal with respect to a printing device 1 with which a new contract is desired to be concluded, the server controller 93 newly registers the device information of the printing device 1 in the area 921. At this stage, the server controller 93 sets the initial value of the contract flag to a value that means "not yet started." The contract flag indicating "not yet started" means a state in which the server 9 itself has not yet confirmed that the printing device 1 that is scheduled to perform the flat-rate printing has activated to operate in the contract mode, although the contract has been concluded between the user and the event person. When the server controller 93 confirms through communication with the printing device 1 that the contract mode of the printing device 1 has been activated, the server controller 93 updates the contract flag of the printing device 1 to a value that means "already started." Based on this process, the printing device 1 is recognized as a contract-subject device on the printing system 100 including the server 9.

The user terminal 2 is a terminal device for the user to perform various input operations for concluding the contract. The user terminal 2 is configured to transmit, to the server 9, a contract request message containing various information about the conclusion of the contract, which is input by the user. For example, as the user terminal 2, an information processing terminal equipped with standard communication functions, such as the PC (Personal Computer), smartphone, and the like may be employed.

Figure 3:
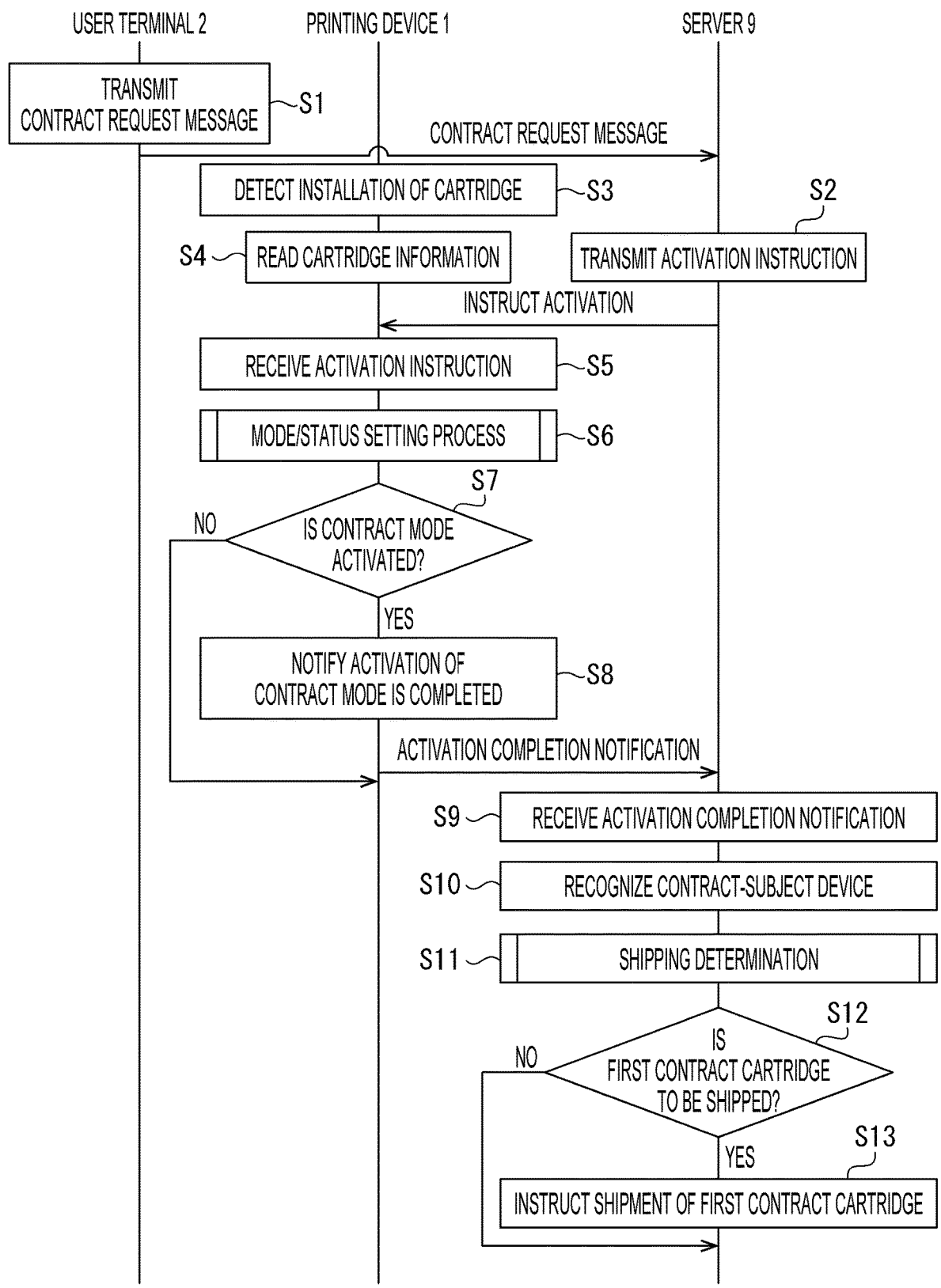
FIG. 3 is a sequence illustrating a process from a conclusion of a contract to a shipment of a first contract cartridge in the printing system according to the first embodiment.

Process Flow from Conclusion of Contract to Shipping of the First Contract Cartridge FIG. 3 is a sequence chart illustrating a flow of processes in a printing system 100, according to one embodiment of the present disclosure, illustrating a flow of process from the conclusion of a contract to the shipment of the first contract cartridge.

In S1, the user terminal 2 transmits a contract request message to the server 9 according to the user's input operation. The contract request message includes the device ID of the printing device 1 on which the user wishes to have the flat-rate printing performed. The server communication unit 91 of the server 9 is configured to receive the contract request message.

In S2, the server controller 93 of the server 9 transmits a request to the printing device 1 in response to the server communication unit 91 receiving the contract request message. This request includes an activation instruction (instruction transmission process).

On the other hand, the printing device 1 is configured to execute the process of S3 and S3 at a particular timing which are not directly related to S1 of S2.

In S3, the controller 80 of the printing device 1 detects the installation of the ink cartridge 4 to a housing of the printing device 1.

In S4, the controller 80 reads the cartridge information of each ink cartridge 4 by referring to the cartridge memory 42 of each of the detected ink cartridges 4. When it is detected that none of the ink cartridges 4 were installed in the printing device 1 at the time of execution of S3, the controller 80 need not execute the process of S4. When the server 9 transmits the activating instruction in S3, the controller 80 executes the process of S5.

In S5, the controller 80 receives the activation instructions transmitted from the server 9 via the communication interface 81. The controller 80 then executes the process of S6.

In the printing device 1, the processes of S3-S4 and S5 may be performed in any order, or the processes of S3-S4 and S5 may be performed at independent timings, respectively. The processes of S3 and Step S4 may be performed periodically. Further, a sensor or the like is configured to detect installation of the ink cartridge 4 in the printing device 1, and the detection of the installation may be used as a trigger to perform the processes of S3 and S4.

In S6, the controller 80 of the printing device 1 performs a mode/status setting process in response to the receipt of the activation instruction. The mode/status setting process is a process of determining whether the various states of the printing device 1 are suitable for activating the contracted mode, and setting the mode and/or status of the printing device 1 (i.e., the state of the printing device 1) according to the determination result. The mode/status setting process will be described in detail later.

In S7, the controller 80 determines whether the controller 80 has activated the contract mode of the printing device 1 as a result of the mode/status setting process in S6. When the contract mode of the printing device 1 has been activated in the mode and status setting process (S7: YES), the controller 80 performs the process of S8. When the controller 80 has not activated the contract mode (S7: NO), the printing device 1 and the server 9 do not perform the process described in the subsequent steps.

In S8 (i.e., in a request transmission process), the controller 80 transmits a notification (i.e., an activation completion notification) to the server 9 indicating that the activation of the contract mode has been completed. The activation completion notification includes, at least, information indicating the cartridge type (i.e., type information) among the cartridge information of each ink cartridge 4 read by the printing device 1. It is noted that the activation completion notification may also include the ink remaining amount of each ink cartridge 4 among the cartridge information detected by the printing device 1.

Using the activation completion notification as a trigger (i.e., in response to the activation completion notification), the server 9 determines whether the first contract cartridge needs to be shipped. When it is determined that the first contract cartridge needs to be shipped, the server 9 issues an instruction to ship the first contract cartridge. Therefore, the activation completion notification is, in other words, a request for provision of the contract cartridge to server 9.

In S9 (i.e., a request reception process), the server 9 receives the activation completion notification. The server 9 performs a process in S10 in response to the activation completion notification.

In S10, the server controller 93 recognizes the printing device 1 as the contract-subject device.

In S11, the server controller 93 performs a shipping determination. The shipping determination is a process of determining whether the first contract cartridge needs to be shipped.

In S12, the server controller 93 determines whether the first contract cartridge is required to be shipped in the shipping determination. An expression "determines whether the first contract cartridge is required to be shipped" may include not only a case where it is determined that the first contract cartridges of all colors that can be installed in the printing device 1 need to be shipped, but also a case where it is determined that only the first contract cartridges of one or some colors need to be shipped. When it is determined that the first contract cartridges need to be shipped (S12: YES), the server controller 93 executes S13. On the other hand, when it is determined that the shipment of the first contract cartridge is not required (S12: NO), the server controller 93 does not execute S13 and terminates the process.

In S13, the server controller 93 instructs the shipment of the first contract cartridge to the user of the printing device 1 (i.e., a provision instruction process). The destination of the shipping instructions is not particularly limited. For example, the server controller 93 may instruct a shipping management server or the like, which manages the shipping of the contract cartridges, to ship the first contract cartridge to the user of the printing device 1.

In the printing system 100, the server 9 may include an information management server equipped with a function to manage customer information regarding the user and the printing device 1, and the shipping management server equipped with a function to manage the shipping of the contract cartridge based on the customer information. In this case, after the information management server recognizes the printing device 1 as the contract-subject device in S8, the information management server instructs the shipping management server to ship the first contract cartridge to the address of the user of the printing device 1. In accordance with the above instruction, the shipping management server proceeds with the process of shipping the first contract cartridge, and finally, a set of the first contract cartridges is delivered to the user.

According to the process of FIG. 3 described above, when the contract mode of the printing device 1 is activated, the printing device 1 can request the server 9 to provide the contract cartridges by means of the activation completion notification. Therefore, the printing device 1 can request the server 9 to provide the contract cartridges without delay after the contract mode of the printing device 1 is activated.

Mode/Status Setting Process

Figure 4:
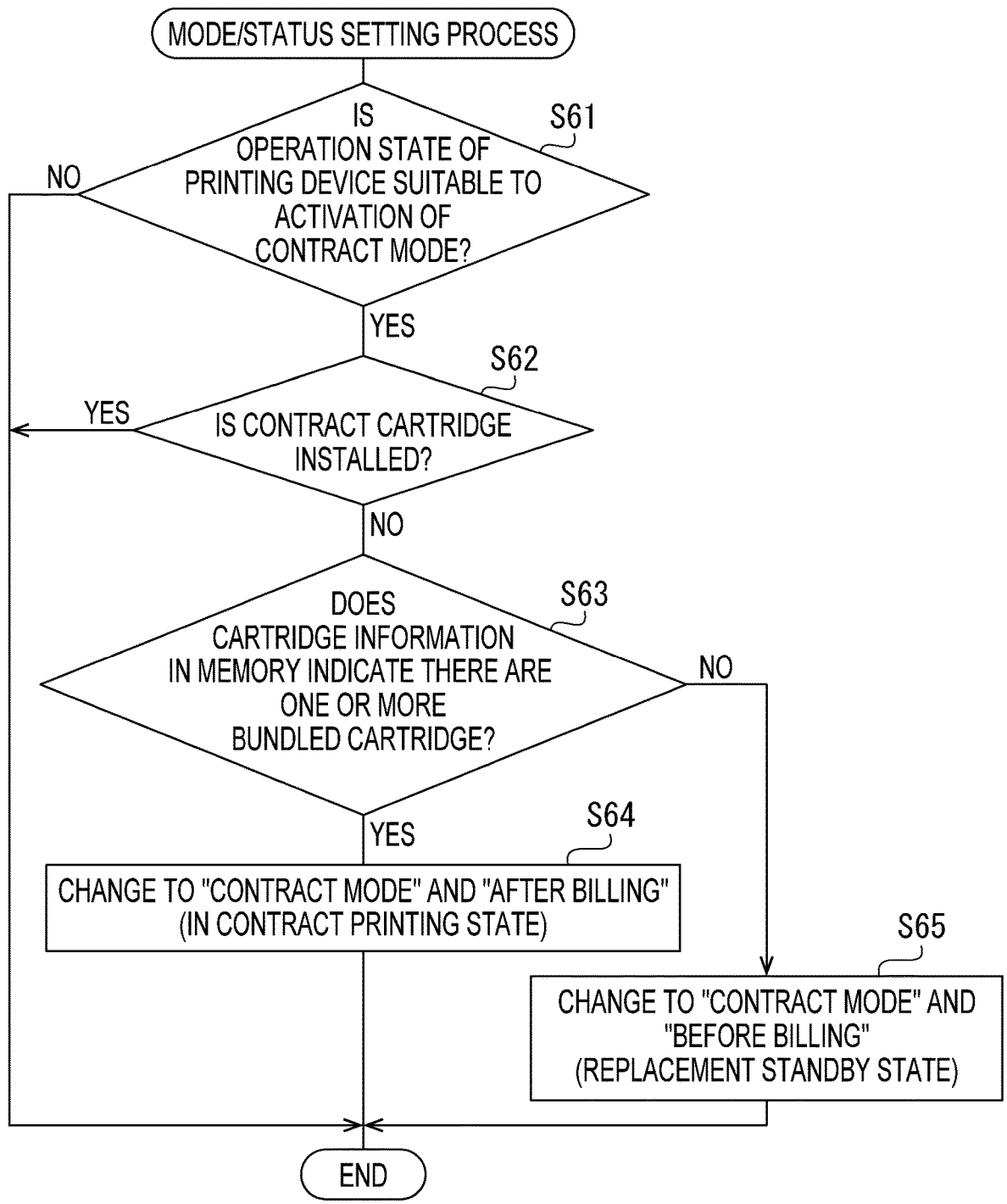
FIG. 4 is a flowchart illustrating a mode and state setting process performed in a printing device.

FIG. 4 is a flowchart illustrating an example of the mode/status setting process performed in the printing device 1.

In S61, the controller 80 determines whether an operating state of the printing device 1 is suitable for activating the contract mode (i.e., an operating state determining process). The operating state in which the printing device 1 is determined to be "suitable for activation" may be defined appropriately in accordance with the type of the printing device 1, the intended use, and the contract conditions.

As above, by determining the suitability of activating the contract mode of the printing device 1 according to the operating state of the printing device 1, it is possible to prevent the process of activating the contract mode from being started when the printing device 1 is in an operating state that is unsuitable for activating the contract mode. Accordingly, it is possible to avoid inconvenience of interrupting the process for activating the contract mode without completing it.

For example, in S61, the controller 80 may determine that activation is unsuitable when an error occurring in the printing device 1 meets particular conditions. More concretely, the controller 80 may determine that activation is unsuitable when a particular type of error has occurred in the printing device 1. The "particular type of error" may include, for example, an error with a power-off operation, an error that may forcefully terminate the operation of the controller 80, or an error that physically or software-wise makes it impossible to execute the flat-rate printing. It is noted that whether the above errors are occurring in the printing device 1 may be monitored by the controller 80 at any time or periodically.

As a result, the controller 80 can prevent the contract mode from being activated even if an activation instruction is received from the server 9 under a situation where a particular error has occurred in the printing device 1. Thus, it is possible to prevent a process related to the activation of the contract mode from being performed in the printing device 1 in which an error unsuitable for activating the contract mode has occurred.

When it is determined that the operating state of the printing device 1 is unsuitable for the activation (S61: NO), the controller 80 does not execute the subsequent steps of S62 to S65 and terminates the mode/status setting process. On the other hand, when it is determined that the operating status of the printing device 1 is suitable for the activation (S61: YES), the controller 80 executes S62.

In S62, the controller 80 determines whether a contract cartridge is installed in the printing device 1. When even one contract cartridge is installed in the printing device 1 (S62: YES), the controller 80 does not execute the subsequent steps of S62 to S65, and terminates the mode/status setting process. In other words, the controller 80 does not activate the contract mode of the printing device 1, and leaves the printing device 1 in the normal mode. On the other hand, when no contract cartridge is installed in the printing device 1 (S62: NO), the printing device 1 executes S63.

The determination process in S62 is not an essential process. However, by adding such a determining process, the contract mode of the printing device 1 can be activated only when, at least one of the bundled cartridge and the commercial cartridge is installed in the printing device 1 and no contract cartridge is installed in the printing device 1.

Therefore, according to the determining process in S62, when an unexpected situation occurs in which the contract cartridge, which should have been available after the printing device 1 activates the contract mode, is installed when the printing device 1 is in the normal mode, it becomes possible that the contract mode of the printing device 1 can be prevented from being activated.

In S63, the controller 80 determines whether one or more bundled cartridges are included in the installed ink cartridge 4 by referring to the cartridge type of the cartridge information in the main memory 82 of the printing device 1. When one or more bundled cartridges are installed (S63: YES), the controller 80 executes S64. On the other hand, when none of the bundled cartridges are installed (S63: NO), the controller 80 executes S65.

In S64, the controller 80 activates the contract mode of the printing device 1 (i.e., a mode activation process). Then, the controller 80 sets the status of the printing device 1 to "after billing." In other words, the controller 80 changes the printing device 1 to the contract printing state (i.e., a status change process).

In S65, the controller 80 activates the contract mode of the printing device 1 (i.e., a mode activation process). Then, the controller 80 sets the status of the printing device 1 to "before billing." In other words, the controller 80 changes the printing device 1 to the replacement standby state (i.e., a standby state changing process).

After execution of S64 or S65, i.e., when the contract mode of the printing device 1 is activated, the controller 80 may execute a remaining amount detection process to detect the ink remaining amount of each of the ink cartridges 4 installed in the housing. When executing the ink remaining amount detection process, the controller 80 may transmit the activation completion notification to the server 9 with including information indicating the ink remaining amount of each of the ink cartridges 4 detected by the ink remaining amount detection process (i.e., ink remaining amount information) in the activation completion notification transmitted in S8, which will be described below.

As the controller 80 executes the remaining amount detection process and transmits the remaining amount information to the server 9, the printing device 1 can notify the server 9 of the ink remaining amount when transmitting a request for provision of a contract cartridge to the server. Accordingly, the server 9 can determine whether and/or when to provide the contract cartridges based on the ink remaining amount of each ink cartridge 4.

According to the mode/status setting process described above, the controller 80 changes the printing device 1 to the contract printing performing state when one or more bundled cartridges are installed in the printing device 1 (S63: YES). Therefore, according to the mode/status setting process, the user can install the bundled cartridges in the printing device 1 after the conclusion of the contract, thereby making the printing device 1 ready for contract printing without waiting for the provision of the contract cartridges from the business entity. Therefore, the printing system 100 of the present embodiment can reduce the time lag between the conclusion of the contract and the start of contract printing based on the contract conditions.

Further, according to the mode/status setting process, when neither the contract cartridge nor the bundled cartridge is installed in the printing device 1 (S62: NO, and S63: NO), the controller 80 can change the mode of the printing device 1 to the replacement standby state and not perform the contract printing until the contract cartridge or the bundled cartridge is installed.

Shipping Determination

Figure 5:
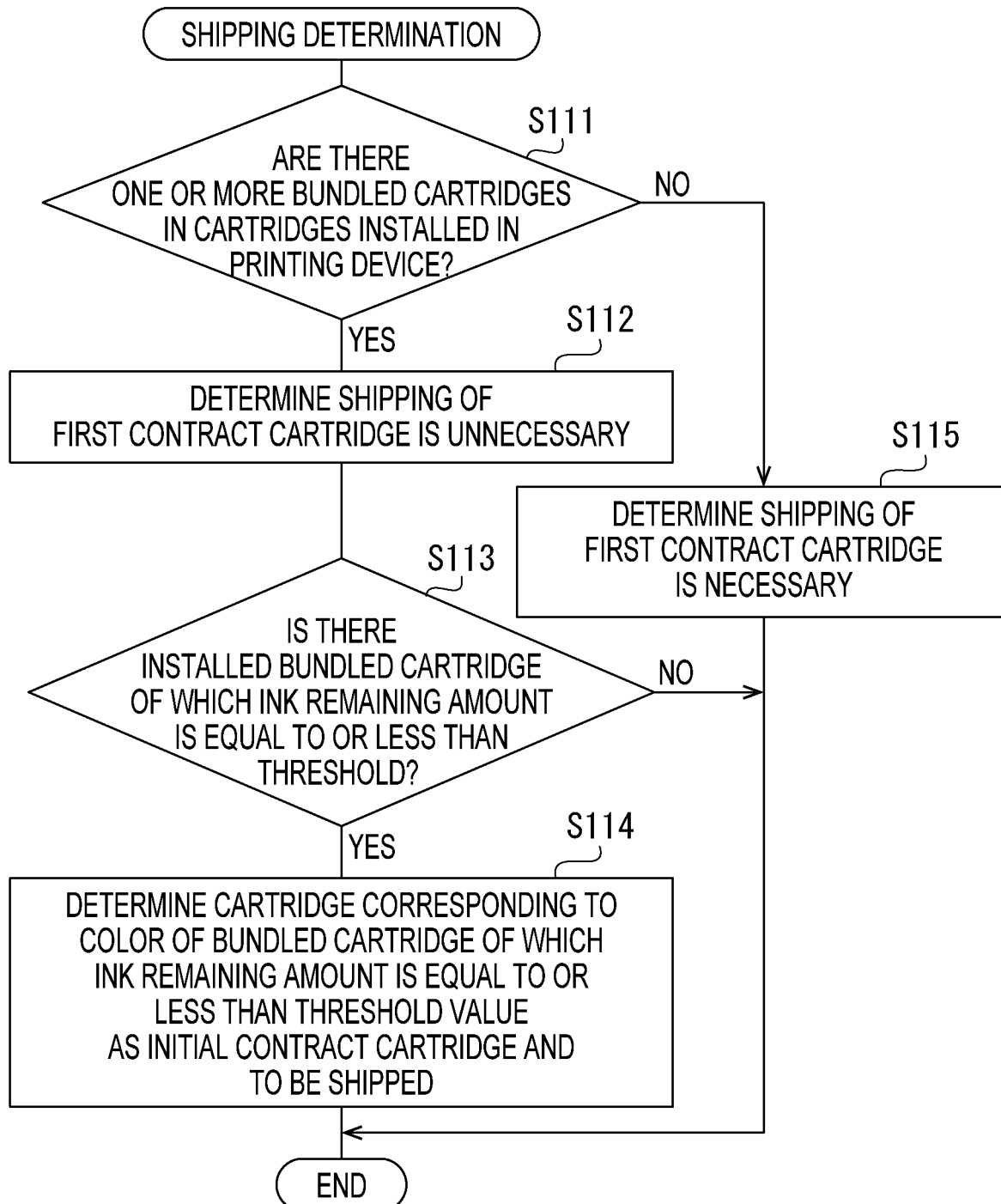
FIG. 5 is a flowchart illustrating a delivery determining process performed in a server.

FIG. 5 is a flowchart illustrating a shipping determination process performed in the server 9. The flowchart in FIG. 5 corresponds to the process in S7 of the sequence chart shown in FIG. 3. That is, the server 9 is in a state where an activation completion notification has just been received from the printing device 1.

In S111, the server controller 93 refers to the cartridge information included in the activation completion notification to determine whether one or more bundled cartridges are included among the ink cartridges 4 installed in the printing device 1. When one or more bundled cartridges are included (S111: YES), the server controller 93 performs the process of S112. On the other hand, when the bundled cartridges are not included in the ink cartridges 4 installed in the printing device 1 (S111: NO), the server controller 93 performs the process of S115.

In S112, the server controller 93 determines that the first contract cartridge does not need to be shipped. When S112 is executed, the server controller 93 executes the determination in S113.

In S113, the server controller 93 determines, by referring to the cartridge information included in the activation completion notification, whether or not an ink cartridge 4 that is a bundled cartridge and of which ink remaining amount is equal to or less than a particular threshold is installed in the printing device 1.

When an ink cartridge 4 that is the bundled cartridge and of which ink remaining amount is equal to or less than the particular threshold is installed in the printing device 1 (S113: YES), the server controller 93 determines that a contract cartridge of the same color as the ink cartridge 4 that is subjected to be the affirmative determination (i.e., YES) in S113 is required to be shipped as the first contract cartridge.

When the ink cartridge 4 that is a bundled cartridge and of which ink remaining amount is equal to or less than the particular threshold is not installed in the printing device 1 (S113: NO), the server controller 93 maintains the determination in S112. That is, the server controller 93 maintains the determination that no shipment of the first contract cartridge is required.

According to the process in S113 and S114, for the cartridges which are the bundled cartridges but the ink remaining amounts are low, replacement contract cartridges are shipped to the user as the first contract cartridges. As mentioned above, the bundled cartridge is an ink cartridge 4 that can be used also for the normal printing. Therefore, the normal printing may have been performed using the bundled cartridge before the contract mode of the printing device 1 is activated. According to the process in S113 and S114, when the remaining amount of the consumables has already decreased at the time when the controller 80 activates the contract mode, the replacement first type consumables can be shipped before the consumables is completely exhausted.

On the other hand, when none of the bundled cartridges are included (S111: NO), the server controller 93 performs the process of S115. In S115, the server controller 93 determines that the first contract cartridges need to be shipped.

Overall Flow

Figure 6:
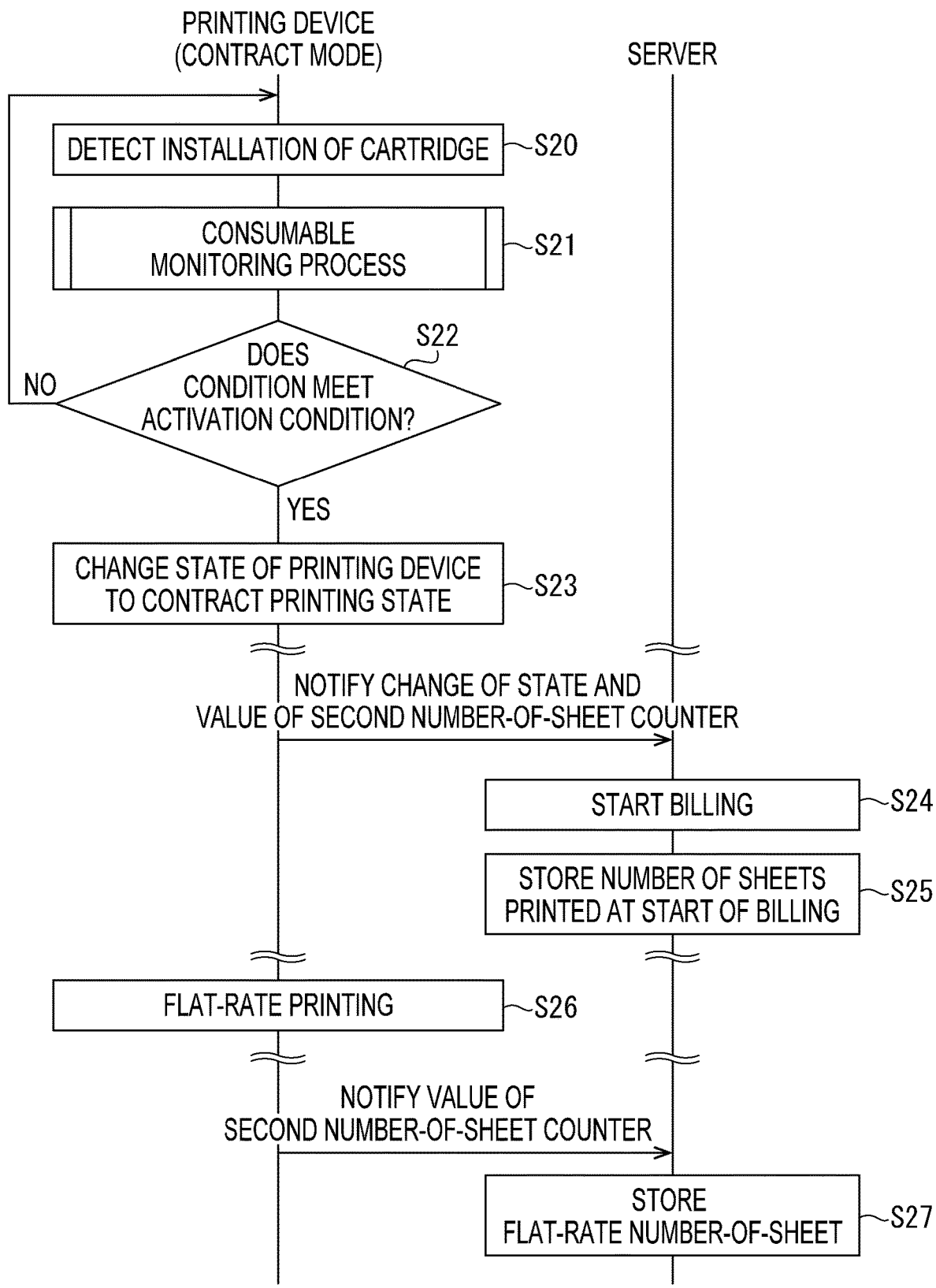
FIG. 6 is a sequence diagram illustrating a process after the printing device activates a contract mode in the printing system according to the first embodiment.

FIG. 6 is a sequence chart illustrating processes after the printing device 1 activates the contract mode in the printing system 100. As an example, FIG. 6 shows a flow of process of the printing device 1 and the server 9 after processes same as the processes shown in FIG. 3 have been performed in the printing system 100. In other words, it is assumed that the contract mode of the printing device 1 has been activated at the start of the process shown in FIG. 6.

In S20, the controller 80 of the printing device 1 detects when one of the cartridges is installed in the printing device 1. For example, after execution of S13 in FIG. 2, the first contract cartridge is shipped to the user. When the user installs this first contract cartridge in the printing device 1, the controller 80 of the printing device 1 detects the installation of the cartridge.

How the controller 80 detects the installation of a cartridge to the printing device 1 may be determined based on the hardware or software specifications of the printing device 1. For example, the printing device 1 may be provided with a housing having an opening for installing a cartridge. The controller 80 may then detect the installation of the cartridge in the housing of the printing device 1 (i.e., a detection process). As a result, the printing device 1 can determine, without delay, when a cartridge is installed, and whether the installed cartridge is an appropriate cartridge for the flat-rate printing.

For example, the controller 80 may determine that a cartridge is installed in the housing when it is detected that the cartridge contacts the housing. For example, the controller 80 may detect the contact of the cartridge with the housing using a sensor or a mechanical detector.

The controller 80 may regard that a cartridge is "installed in the housing" when the controller 80 detects a user operation related to the installation of the cartridge in the housing. For example, when the printing device 1 is provided with a cover for opening and closing an opening of the housing, the controller 80 may detect that the cover has been closed based on a sensor or a mechanical detector (i.e., a detection process). Then, when the controller 80 detects that the cover has been closed, the controller 80 may regard that the consumables have been installed in the housing. This allows the printing device 1 to determine whether or not the cartridge is a particular type of consumable at the timing when the user has installed the cartridge in the housing and closed the cover. As a result, the user can determine, without delay, whether the appropriate consumables are installed for the flat-rate printing.

In S21, the controller 80 performs the consumable monitoring process. The consumable monitoring process is a process of monitoring and determining whether one or more cartridges installed in the printing device 1 include a cartridge of a particular type that meets the conditions for changing to the contract printing state, which is a state in which the flat-rate printing is possible. In the present embodiment, the "cartridges of a particular type" refers to the contract cartridges.

Consumable Monitoring Process

Figure 7:
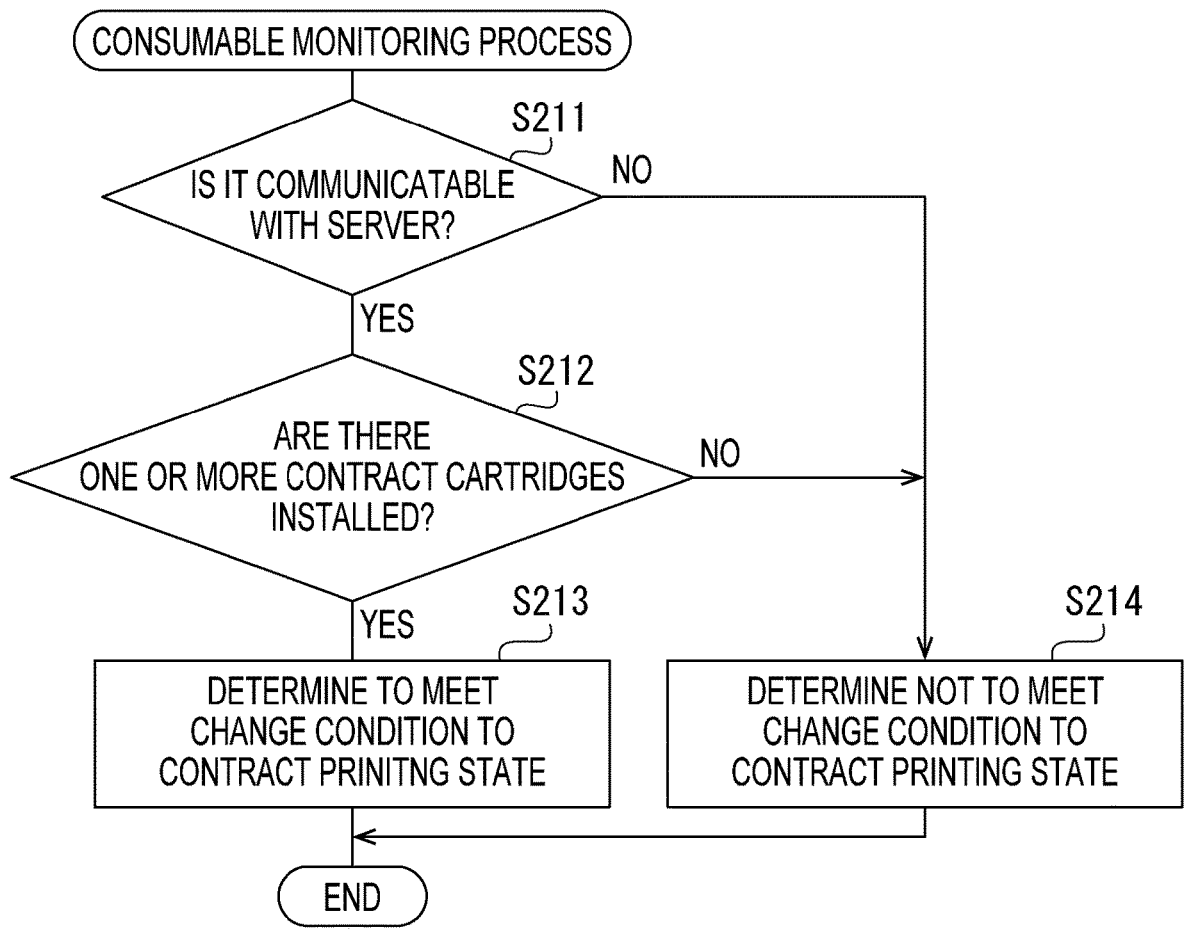
FIG. 7 is a flowchart illustrating a consumable monitoring process.

FIG. 7 is a flowchart illustrating the consumable monitoring process. As mentioned above, it is assumed that the controller 80 periodically performs the communication monitoring process.

In S211, the controller 80 determines whether the printing device 1 is in a state where communication with the server 9 is possible. For example, the controller 80 is configured to identify the communication status between the printing device 1 and the server 9 by referring to the information of the communication status in the main memory 82. When the printing device 1 and the server 9 are in a communication-activated state (S211: YES), the controller 80 executes S212.

It is noted that the determining process in S211 is not mandatory. However, by executing the determining process in S211, the printing device 1 can activate the contract printing when the printing device 1 and the server 9 can exchange various information on the contract printing.

In S212, the controller 80 determines whether one or more contract cartridges are installed in the printing device 1. When one or more contract cartridges are installed in the printing device 1 (S212: YES), the controller 80 executes S213.

In S213, the controller 80 determines that the printing device 1 meets the conditions for changing to the contract printing state.

On the other hand, when the printing device 1 and the server 9 are unable to communicate (S211: NO), or when no contract cartridge is installed in the printing device 1 (S212: NO), the controller 80 executes S214.

In S214, the controller 80 determines that the printing device 1 does not meet the conditions for changing to the contracted printing state.

Returning to FIG. 6, and a further description will be made. In S22, the controller 80 performs a process according to the result of the consumable monitoring process described above. That is, when the printing device 1 meets the conditions for changing to the contract printing state (S22: YES), the controller 80 executes S23. On the other hand, when the printing device 1 does not meet the conditions for changing to the contracted printing state (S22: NO), the controller 80 waits until the process in S20 is executed again.

In S23, the controller 80 changes the status of the printing device 1 to "after billing," thereby changing the printing device 1 to the contract printing state. Thereafter, the controller 80 notifies the server 9 that the printing device 1 has been changed to the contract printing state. As a result, the printing device 1 can notify the server 9 that the printing device 1 will start using the flat-rate printing service. The controller 80 may also notify the server 9 of the value of the second number-of-sheet counter together with the change of the status of the printing device.

The timing of transmission of the aforementioned notification is not limited to a particular timing within a period before the flat-rate printing of S26. For example, when the controller 80 is configured to periodically communicate with the server 9, the controller 80 may transmit the aforementioned notification to the server 9 at the communication timing immediately after the execution of S22.

In S24, the server 9 starts billing for the printing device 1. Concretely, when the server controller 93 of the server 9 receives the aforementioned notification, the server controller 93 updates the device information about the printing device 1. That is, the server controller 93 changes the start flag, which is included in the device information of the printing device 1 that received the notification, to "already started" among the device information stored in the server memory 92. The server 9 then executes S25.

In S25, the server controller 93 of the server 9 stores the number of sheets printed at the start of billing. Concretely, the server controller 93 stores the value of the second number-of-sheet counter included in the notification from the controller 80 as the value of the second number-of-sheet counter in the device information of the printing device 1 that has transmitted the notification. As a result, the value of the second number-of-sheet counter at the time when the flat-rate printing service is started in the printing device 1, i.e., at the time when billing starts, is stored in the server 9. After transmitting the notification, the server 9 executes S26.

In S26, the printing device 1 executes the flat-rate printing. For example, after step S23 and transmission of the notification to the server 9, the printing device 1 executes the flat-rate printing in accordance with the input operation of the user or a printing instruction from a device wired or wirelessly connected to the printing device 1, such as a personal computer. After the flat-rate printing is executed, the controller 80 updates the value of the second number-of-sheet counter in the area 827 of the main memory 82, and then notifies the server 9 of the updated value of the second number-of-sheet counter. The server 9 receives the value of the second number-of-sheet counter.

In S27, the server controller 93 of the server 9 stores the value obtained by subtracting the value of the second number-of-sheet counter stored in the device information in the area 921 from the received value of the second number-of-sheet counter as the fixed number of sheets to be printed. In addition, the server controller 93 updates the value of the second number-of-sheet counter in the device information with the received value of the second number-of-sheet counter.

Thereafter, the value of the second number-of-sheet counter is transmitted from the printing device 1 to the server 9 at a particular timing. Each time the server controller 93 of the server 9 receives the value of the second number-of-sheet counter, the server controller 93 stores, in the device information as the fixed number of sheets to be printed, the difference in the number of sheets between the previously received value of the second number-of-sheet counter, i.e., the value of the second number-of-sheet counter stored in the device information, and the latest received value of the second number-of-sheet counter. This allows the server 9 to obtain the number of printed materials printed by using the flat-rate printing service at the printing device 1.

According to the above process, the printing device 1 enables the flat-rate printing when the printing device 1 and the server 9 are in communication and one or more contract cartridges are installed in the printing device 1. As a result, the flat-rate printing can be executed when the printing device 1 and the server 9 are capable of exchanging various information on the flat-rate printing. In other words, the counting of the "flat-rate" period of the flat-rate printing starts. Therefore, the printing device 1 can start the flat-rate printing service at an appropriate timing.

According to the above processes, the printing device 1 notifies the server 9 that the printing device 1 has been changed to the contract printing state after execution of S23. As a result, the printing device 1 can notify the server 9 that the printing device 1 will start using the subscription printing service. In addition, the server 9 can appropriately determine the start timing of billing for the flat-rate printing by the notification from the controller 80.

First Modification

In the above description, a case where the printing device 1 is an inkjet printer is described. However, the printing device 1 should not be limited to the inkjet printer, but may be a printer capable of installing a toner cartridge and a drum cartridge, or a combined cartridge in which the toner cartridge and the drum cartridge are integrated. When the printing device 1 is a printer capable of installing the toner cartridge and the drum cartridge, the same information as for the ink cartridge 4 described in the first embodiment is stored in the toner cartridge and/or the drum cartridge. The controller 80 of the printing device 1 may then read the cartridge information from the toner cartridges and/or drum cartridges and store the same in the area 821 of the main memory 82. The handling of the cartridge information thereafter is the same as that described in the first embodiment.

Second Modification

In the above explanation, a case where there are two modes of the printing device 1 (i.e., the contract mode and the normal mode) is described. However, the number and types of modes of the printing device 1 are not necessarily limited to those of the first embodiment. For example, it is possible that two types of contracts are made for the printing device 1. In such a case, there may be three modes of the printing device 1 including a normal mode in which no mode for any contract is activated, a first contract mode in which contract printing for the first contract is possible, and a second contract mode in which contract printing for the second contract is possible. Similarly, when the number of contract types increases, the number of contract modes may increase by that amount. There may also be other modes of the printing device 1 that are different from the normal mode and do not involve the conclusion of a contract.

It is further noted that the type of contract printing is not necessarily limited to the flat-rate printing. For example, when the mode is the first contract mode and the status is "after billing," the flat-rate printing may be possible, and when the mode is the second contract mode and the status is "after billing," a quantitative printing, which permits printing up to a certain amount of printing, may be possible. As above, when there are multiple types of contract printing, the controller 80 should be configured to activate the contract printing corresponding to the activated contract mode. Optionally, even when any of the contract printing is activated, normal printing may be made executable each time when only the commercial cartridges are installed in the printing device 1.

Software Implementation

The control blocks of the printing device 1 and server 9 may be realized by logic circuits (i.e., hardware) formed in integrated circuits (e.g., IC chips) or other devices, by software, or combinations thereof.

In the latter case, each of the printing device 1 and the server 9 are equipped with a computer that executes the instructions of a program, which is software that realizes each function. Such a computer is equipped with one or more processors, for example, and a non-transitory computer-readable recording medium that stores the program. Then, in the computer, aspects of the present disclosures are realized when the processor reads the program (i.e., instructions) from the recording medium and executes the same. As the processor, for example, a CPU (Central Processing Unit) can be used. As the recording medium, a "non-temporary tangible medium," for example, ROM (Read Only Memory), or the like as well as tape, disk, card, semiconductor memory, programmable logic circuit, and the like can be used. The processor may also be further equipped with a RAM (Random Access Memory), and the like, in which the program is deployed. The program may be supplied to the computer via any transmission medium capable of transmitting the program (e.g., a communication network, a broadcast wave, etc.). One aspect of the present invention may also be realized in the form of a data signal embedded in a carrier wave, wherein the program is embodied by electronic transmission.

The present disclosures are not necessarily limited to the aforementioned embodiments, but various changes can be made within scopes indicated in the claims, and embodiments obtained by combining technical means disclosed in different embodiments/modifications are also included in aspects of the present disclosures.

What is claimed is:

1. A printing device comprising:
   a housing;

a communication interface configured to communicate with an external device configured to communicate with the printing device; and a controller, wherein the printing device is configured to operate printing either in a first mode or in a second mode that is different from the first mode, wherein the housing is configured such that one or more consumables including a first type consumable and a second type consumable are attachable, the first type consumable being dedicated for printing in the first mode, the second type consumable being usable for printing in both the first mode and the second mode, and wherein the controller is configured to perform, in a case where the second type consumable is attached to the housing, changing a state of the printing device to a first printing state in which the first printing is activated and activating the first mode of the printing device in response to an activation instruction from the external device.

2. The printing device according to claim 1, wherein the controller is configured to perform:

activating of the first mode of the printing device in response to the activation instruction; and in a case where the second type consumable is attached to the housing, changing of the state of the printing device to the first printing state after the activating of the first mode.

3. The printing device according to claim 1, wherein the first type consumable is a consumable supplied from a business entity to a user of the printing device, and wherein the second type consumable is a consumable bundled with the printing device when the printing device is purchased.

4. The printing device according to claim 1, wherein the housing is configured to be attached with a third type consumable usable for printing other than the first printing, and wherein, when at least one of the second type consumable and the third type consumable is attached to the printing device and when the first type consumable is not attached to the printing device, the controller is configured to activate the first mode of the printing device in the activating.

5. The printing device according to claim 4, wherein, when the third type consumable is attached to the printing device in the activating, the controller is configured to change the state of the printing device to a replacement standby state, the replacement standby state being a state in which the controller waits for replacement of the third type consumable to at least one of the first type consumable and the second type consumable.

6. The printing device according to claim 1, wherein the controller is configured to transmit a provision request of the first consumable to the external device when the first mode of the printing device is activated.

7. The printing device according to claim 6, wherein the controller is configured to perform:

when the first mode of the printing device is activated, detecting a remaining amount of consumables attached to the housing; and when the provision request is transmitted, transmitting the provision request with remaining amount information indicating the remaining amount of the consumables detected in the detecting.

8. The printing device according to claim 1, wherein the controller is configured to perform:

in response to the activation instruction, determining whether an operating state of the printing device is appropriate for activation of the first mode; and when it is determined, in the determining, that the operating state of the printing device is appropriate for the activation of the first mode, activating the first mode.

9. The printing device according to claim 8, wherein the controller is configured to perform:

when an error occurring in the printing device meets a particular condition, determining that the operating state of the printing device is inappropriate for the activation of the first mode.

10. The printing device according to claim 1, wherein the controller is configured to perform:

monitoring a communication condition between the printing device and the external device; and when the first mode of the printing device is activated, the printing device and the external device are in a communicable state, and one of the first type consumable and the second type consumable is installed in the housing, changing the state of the printing device to the first printing state.

11. The printing device according to claim 1, wherein the first mode is a mode in which the printing device is recognized as a device subjected to a contract that is qualified to perform contract printing based on contract terms of the first with a business entity, and the second mode is a mode in which the printing device does not perform the contract printing.

12. A printing system including an external device and a printing device, wherein the printing device comprises:

a housing;

a communication interface configured to communicate with the external device; and a controller, wherein the printing device is configured to operate either in a first mode or in a second mode, the first mode being a mode in which the printing device is recognized as a device subjected to a first that is qualified to perform first printing based on first terms of the first with a business entity, the second mode being a mode in which the printing device does not perform the first printing, wherein the housing is configured such that one or more consumables including a first type consumable and a second type consumable are attachable, the first type consumable being dedicated for the first printing in the first mode, the second type consumable being usable for printing in both the first mode and the second mode, wherein the controller is configured to perform:

in response to an activation instruction from the external device, activating the first mode of the printing device;

in a case where the second type consumable is attached to the housing, changing a state of the printing device to a first printing state in which the first printing is activated and the activating of the first mode; and transmitting a provision request of the first consumable to the external device when the first mode of the printing device is activated, wherein the controller is further configured to perform:

transmitting, to the external device, the provision request with type information indicating a type of consumable installed in the printing device, and wherein the external device includes an external device controller configured to perform:
- transmitting the activation instruction to the printing device;
- receiving the provision request transmitted from the printing device;
- determining, based on the type information, whether the second type consumable is installed in the printing device;
- when the second type consumable is not installed in the printing device, instructing provision of the first type consumable to a user of the printing device; and
- when the second type consumable is not installed in the printing device, not instructing the provision of the first type consumable to the user of the printing device.

13. The printing system according to claim 12, wherein the controller is configured to perform:
- when the first mode of the printing device is activated, detecting a remaining amount of consumables attached to the housing; and
- when the provision request is transmitted, transmitting the provision request with remaining amount information indicating the remaining amount of the consumables detected in the detecting, wherein the external device controller is configured to:
- receiving the remaining amount information from the printing device in the receiving the provision request; and
- when the remaining amount of the consumable indicated by the remaining amount information is equal to or less than a particular threshold, performing the instructing provision of the first type consumable even if the consumable of which remaining amount is equal to or less than the particular threshold is the third type consumable.

14. The printing device according to claim 12, wherein the first mode is a mode in which the printing device is recognized as a device subjected to a contract that is qualified to perform contract printing based on contract terms of the first with a business entity, and the second mode is a mode in which the printing device does not perform the contract printing.

15. A non-transitory computer-readable recording medium for a printing device including a housing, a communication interface configured to communicate with an external device, and a controller,
wherein the printing device is configured to operate either in a first mode or in a second mode, the first mode being a mode in which the printing device is recognized as a device subjected to a first that is qualified to perform first printing based on first terms of the first with a business entity, the second mode being a mode in which the printing device does not perform the first printing,
wherein the housing is configured such that one or more consumables including a first type consumable and a second type consumable are attachable, the first type consumable being dedicated for the first printing in the first mode, the second type consumable being usable for printing in both the first mode and the second mode, and
wherein the non-transitory computer-readable recording medium containing computer-executable instructions which cause, when executed by the controller, the printing device to perform:
- in response to an activation instruction from the external device, activating the first mode of the printing device; and
- in a case where the second type consumable is attached to the housing, changing a state of the printing device to a first printing state in which the first printing is activated and the activating of the first mode.

16. The printing device according to claim 15, wherein the first mode is a mode in which the printing device is recognized as a device subjected to a contract that is qualified to perform contract printing based on contract terms of the first with a business entity, and the second mode is a mode in which the printing device does not perform the contract printing.

* * * * *